(12) United States Patent
Gottwald

(10) Patent No.: US 9,178,643 B2
(45) Date of Patent: Nov. 3, 2015

(54) PROCESSING DATA IN AN OPTICAL NETWORK

(75) Inventor: Erich Gottwald, Holzkirchen (DE)

(73) Assignee: Xieon Networks S.a.r.l., Luxembourg (LU)

(*) Notice: Subject to any disclaimer, the term of this patent is extended or adjusted under 35 U.S.C. 154(b) by 69 days.

(21) Appl. No.: 13/985,767

(22) PCT Filed: Feb. 15, 2011

(86) PCT No.: PCT/EP2011/052212
§ 371 (c)(1),
(2), (4) Date: Sep. 30, 2013

(87) PCT Pub. No.: WO2012/110081
PCT Pub. Date: Aug. 23, 2012

(65) Prior Publication Data
US 2014/0016940 A1   Jan. 16, 2014

(51) Int. Cl.
*H04B 10/272* (2013.01)
*H04J 14/02* (2006.01)
*H04B 10/40* (2013.01)
*H04J 14/06* (2006.01)

(52) U.S. Cl.
CPC .............. *H04J 14/02* (2013.01); *H04B 10/272* (2013.01); *H04B 10/40* (2013.01); *H04J 14/025* (2013.01); *H04J 14/0227* (2013.01); *H04J 14/0228* (2013.01); *H04J 14/0238* (2013.01); *H04J 14/0257* (2013.01); *H04J 14/06* (2013.01)

(58) Field of Classification Search
CPC . H04J 14/025; H04J 14/0227; H04J 14/0228; H04J 14/0238; H04J 14/0257; H04B 10/272; H04B 10/2587
See application file for complete search history.

(56) References Cited

U.S. PATENT DOCUMENTS

2009/0148165 A1   6/2009   Kim et al.
2010/0142955 A1*  6/2010   Yu et al. ................ 398/72

FOREIGN PATENT DOCUMENTS

WO   2012/110081 A1   8/2012

OTHER PUBLICATIONS

Narasimha, Adithyaram et al., "Maximizing Spectral Utilization in WDM Systems by Microwave Domain Filtering of Tandem Single Sidebands," IEEE Transactions on Microwave Theory and Techniques, vol. 49(10):2042-2047 (2001).
International Search Report and Written Opinion for Application No. PCT/EP2011/052212, 13 pages, dated Mar. 28, 2011.

* cited by examiner

*Primary Examiner* — Leslie Pascal
(74) *Attorney, Agent, or Firm* — Nelson Mullins Riley & Scarborough LLP

(57) ABSTRACT

A method and devices for processing data in an optical network are provided, wherein a centralized component is connected to several decentralized components; wherein first data is conveyed from the centralized component to at least two decentralized components, wherein at least two decentralized components share an optical resource; and wherein second data is conveyed from the decentralized component to the decentralized component via at least one separate optical resource. Furthermore, a communication system is suggested comprising said device.

12 Claims, 6 Drawing Sheets

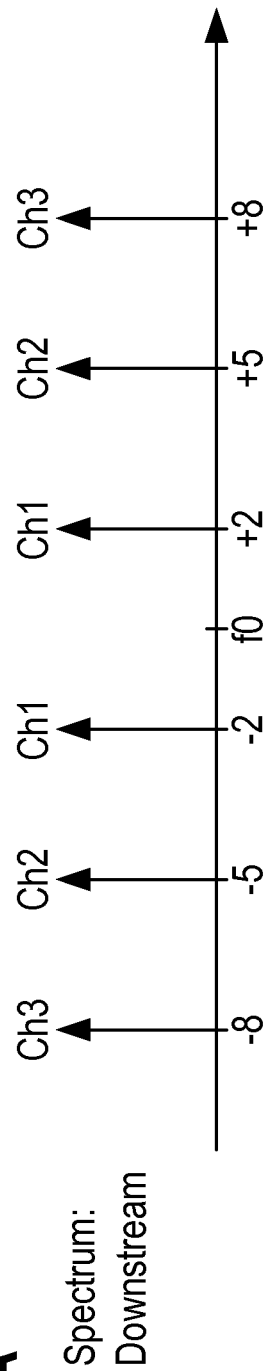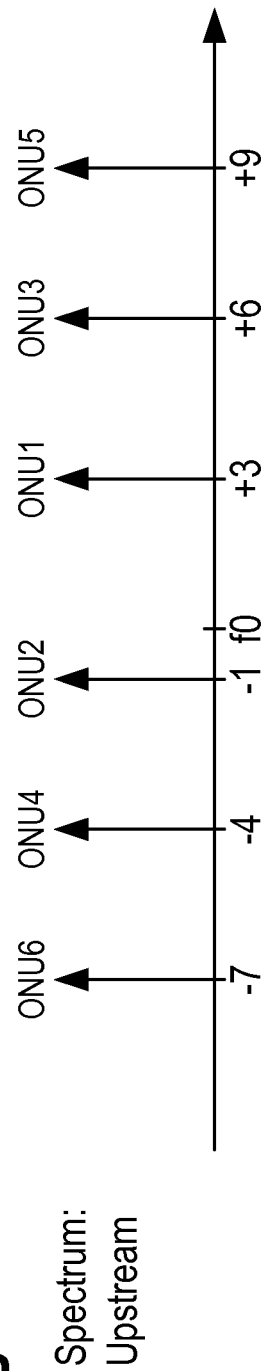
Fig.2A Spectrum: Downstream
Fig.2B Spectrum: Upstream

PROCESSING DATA IN AN OPTICAL NETWORK

RELATED APPLICATIONS

This application is a 35 U.S.C. 371 national stage filing of International Application No. PCT/EP2011/052212, filed on Feb. 15, 2011. The contents of the aforementioned applications are hereby incorporated by reference.

The invention relates to a method for processing data in an optical network and to components of such optical network.

A passive optical network (PON) is a promising approach regarding fiber-to-the-home (FTTH), fiber-to-the-business (FTTB) and fiber-to-the-curb (FTTC) scenarios, in particular as it overcomes the economic limitations of traditional point-to-point solutions.

Several PON types have been standardized and are currently being deployed by network service providers worldwide. Conventional PONs distribute downstream traffic from the optical line terminal (OLT) to optical network units (ONUs) in a broadcast manner while the ONUs send upstream data packets multiplexed in time to the OLT. Hence, communication among the ONUs needs to be conveyed through the OLT involving electronic processing such as buffering and/or scheduling, which results in latency and degrades the throughput of the network.

In fiber-optic communications, wavelength-division multiplexing (WDM) is a technology which multiplexes multiple optical carrier signals on a single optical fiber by using different wavelengths (colors) of laser light to carry different signals. This allows for a multiplication in capacity, in addition to enabling bidirectional communications over one strand of fiber.

WDM systems are divided into different wavelength patterns, conventional or coarse and dense WDM. WDM systems provide, e.g., up to 16 channels in the 3rd transmission window (C-band) of silica fibers of around 1550 nm. Dense WDM uses the same transmission window but with denser channel spacing. Channel plans vary, but a typical system may use 40 channels at 100 GHz spacing or 80 channels at 50 GHz spacing. Some technologies are capable of 25 GHz spacing. Amplification options enable the extension of the usable wavelengths to the L-band, more or less doubling these numbers.

Optical access networks, e.g., coherent Ultra-Dense Wavelength Division Multiplex (UDWDM) networks, are deemed to be a promising approach for future data access.

Data transmission of spectrally densely spaced wavelengths is utilized by applications as Next Generation Optical Access (NGOA) systems allowing high data rates of, e.g., 100 Gbit/s.

In these optical scenarios, a multitude of optical wavelengths are required in order to be individually modulated. Such optical wavelengths may have a spectral distance of a few gigahertz and can be used either for a ultra dense wavelength grid optical access system like NGOA where each user may be assigned a wavelength of his own or for a transmission of high data rates such as 100 Gbit/s where a multitude of wavelengths are bundled and are transmitted over a small spectral range.

Single sideband modulators (SSBMs) are known to generate a single sideband, modulated with user data, onto either the low- or high frequency side of a spectrum. Such SSBMs lead to a rather complex transmitter design.

The problem to be solved is to overcome the disadvantage stated above and in particular to provide an efficient solution for conveying data across an optical network.

This problem is solved according to the features of the independent claims. Further embodiments result from the depending claims.

In order to overcome this problem, a method for processing data in an optical network is provided wherein a centralized component is connected to several decentralized components;

wherein first data is conveyed from the centralized component to at least two decentralized components, wherein the at least two decentralized components share an optical resource;

wherein second data is conveyed from the decentralized component to the decentralized component via at least one separate optical resource.

In particular, the several decentralized components may each use its own optical resource for conveying upstream data to the centralized component. Preferably, the downstream and upstream data use different optical resources, e.g., wavelength or frequency ranges.

Advantageously, this approach does not require single side-band modulators, which is in particular beneficial as it simplifies the design of the components involved. Instead of using a single side band modulator (or IQ modulator), which typically comprises two nested Mach Zehnder modulators, a simple Mach Zehnder modulator is sufficient. This reduces the complexity at the transmitter of the centralized component, e.g., of an optical line terminal (OLT), because instead of two DACs and two modulator amplifiers only a single DAC and only one amplifier are required.

In an embodiment, the optical resource and the at least one separate optical resource are not identical and in particular occupy different bandwidths.

In another embodiment, the optical resource and the at least one separate optical resource corresponds to a wavelength range around at least one carrier frequency.

In a further embodiment, the optical resource shared by the at least two decentralized components comprises a dual sideband spectrum.

In a next embodiment, the first data received at the at least two decentralized components is decoded and only the portion of the first data that is addressed to the particular decentralized component is further processed by this particular decentralized component.

It is also an embodiment that the shared optical resource is used to convey equal or different amounts of first data to each of the at least two decentralized components.

Pursuant to another embodiment, the first data conveyed to each of the at least two decentralized components via the shared optical resource is logically separated into data portions for each of the at least two decentralized components or for all or a group of the at least two decentralized components.

It is noted that the first data conveyed in downstream direction towards the several decentralized components, in particular to two of the decentralized components via dual sideband modulation, can be logically separated at the decentralized components. For example, each decentralized component can use a particular code or key in order to properly decode the portion of the first data that was intended to be received and processed by this particular decentralized component. Furthermore, the decentralized components using the same optical resource can each use a constant or varying amount of bandwidth of this resource, e.g., 25%, 50%, 80%, etc. The amount of resource shared can be dynamically assigned by the centralized component and/or dynamically requested by the decentralized component. It is also an option that a certain portion of this resource is used for broadcast or multicast purposes, i.e. a portion of the first data can be received and processed by all (broadcast) or by several (multicast) decentralized components.

According to an embodiment, the centralized optical component comprises a Mach-Zehnder modulator, a two-beam interferometer or a Michelson interferometer structure.

The centralized optical component may in particular be a centralized electrical-optical component.

The problem stated above is also solved by a device comprising a processing unit that is arranged such that the method as described herein is executable thereon.

It is noted that the steps of the method stated herein may be executable on this processing unit as well.

It is further noted that said processing unit can comprise at least one, in particular several means that are arranged to execute the steps of the method described herein. The means may be logically or physically separated; in particular several logically separate means could be combined in at least one physical unit.

Said processing unit may comprise at least one of the following: a processor, a microcontroller, a hard-wired circuit, an ASIC, an FPGA, a logic device.

The problem above is also solved by a centralized component in an optical network
that is connected to several decentralized components,
comprising a processing unit that is arranged
for conveying first data from the centralized component to at least two decentralized components via a common optical resource;
for receiving second data from at least one of the decentralized components via at least one separate optical resource.

According to an embodiment, the centralized component is an optical line terminal connected to several optical network units.

The problem indicated above is further solved by a decentralized component in an optical network
that is connected to a centralized component,
comprising a processing unit that is arranged
for receiving first data from the centralized component, which is also conveyed to at least one other decentralized component via a common optical resource;
for conveying second data to the centralized component via at least one separate optical resource.

In yet an embodiment, the decentralized component is an optical network unit connected to an optical line terminal.

Furthermore, the problem stated above is solved by a communication system comprising at least one of the devices as described herein.

Embodiments of the invention are shown and illustrated in the following figures:

FIG. 2A shows a schematic diagram (frequency plan) of a spectrum in an optical domain comprising downstream channels (from an OLT to several ONUs) around carrier frequencies located at a given (frequency) distance from a base frequency f0;

FIG. 2B shows a schematic diagram (frequency plan) of a spectrum in an optical domain comprising upstream channels (from the several ONUs to the OLT) in view of the base frequency f0;

Figure 5:
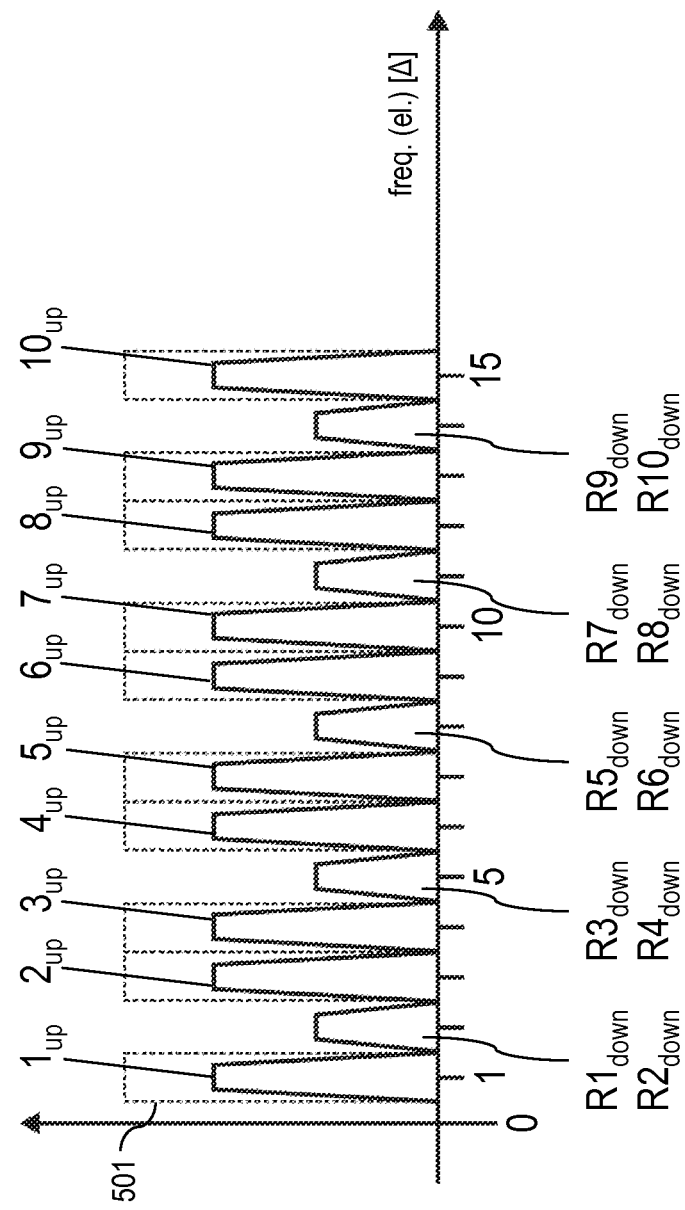
Figure 6:
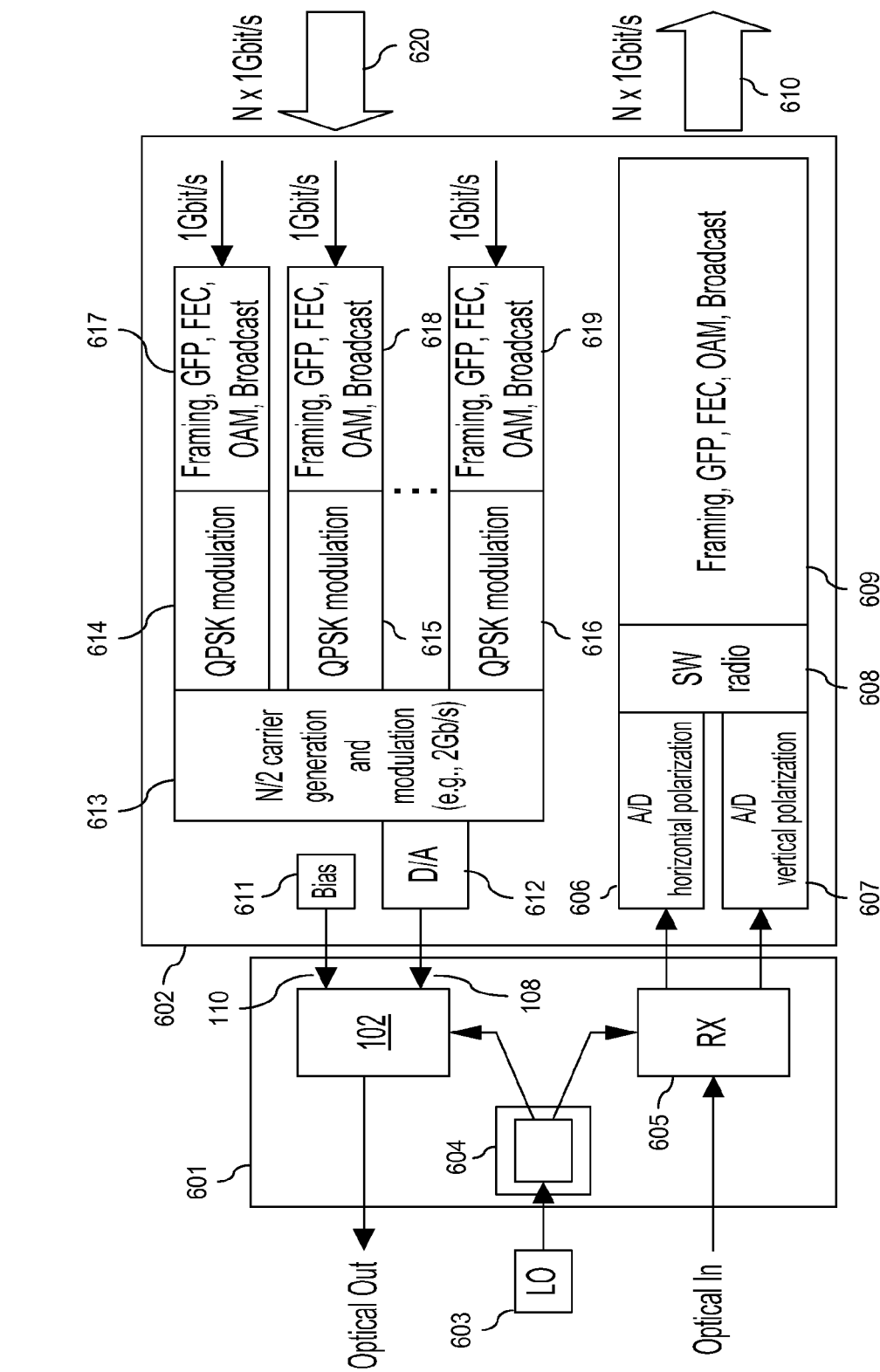

FIG. 4A to FIG. 4D each shows a frequency diagram in an electrical domain (depicting an electrical frequency in view of a spectral density) at a receiver of the ONU that processes a particular signal utilizing an electrical bandpass filter;

FIG. 5 shows a frequency diagram in an electrical domain (depicting an electrical frequency in view of a spectral density) at a receiver of the OLT;

FIG. 6 shows an exemplary diagram of an N-carrier transceiver that could be located in an OLT.

The solution presented herein describes a method of generating and/or detecting a multitude of individually modulated optical wavelengths with a spectral distance of, e.g., (only) a few GHz, wherein the optical wavelengths may be generated based on a single laser source.

An application for such ultra dense wavelength grid could be an optical access system like NGOA, which may provide a wavelength (or wavelength range) for every user or subscriber.

It is noted that, e.g., ultra dense wavelength grid optical access systems can be referred to as NGOA which could provide for each subscriber, user or service (or group thereof) a separate wavelength (i.e. at least one wavelength range). Also, a particular wavelength (i.e. wavelength range) can be assigned to at least one subscriber, user or service.

The solution further allows for an arbitrary split between broadcast data and individual (user) data. Also, a pair-wise split between two channels transmitted at the same wavelength amount in down-stream direction can efficiently be realized.

Thus, optical modulated carriers can be created twice in downstream direction as dual side-band spectrum thereby doubling a data rate (e.g., 1 Gb/s to 2 Gb/s); hence, each signal comprises information for two optical network units (ONUs). A separation of the two different downstream signals conveyed via the same optical frequency (wavelength) can be done, e.g., logically: For example,
odd bytes can be assigned to a first ONU and even bytes can be assigned to a second ONU;
a percentage amounting to X of the data can be assigned to the first ONU and a percentage of 100-X can be assigned to the second ONU;
ONU-individual decoding mechanism can be used in order to ensure that only the correct ONU is able to decode the user data.

It is noted that these examples can be flexibly adjusted according to a particular demand of the system, user and/or operator.

Hence, there is no need for single sideband modulators. This is beneficial as it simplifies the design of the components involved. Instead of using a single side band modulator (or IQ modulator), which typically comprises two nested Mach Zehnder modulators, a simple Mach Zehnder modulator can be used. This reduces the complexity at the transmitter of the centralized component, e.g., of an optical line terminal (OLT), because instead of two DACs and two modulator amplifiers only a single DAC and only one amplifier are required.

Although the channel data rate is doubled, the bandwidth-capability of the modulator does not have to be twice as high, because it depends primarily on the highest carrier frequency.

As the ONUs can be assigned pair-wise to the upper and to the lower sideband channels, the separation of traffic conveyed from the ONUs to the OLT in upstream direction can be achieved via a heterodyne receiver as each ONU may use a different optical carrier frequency.

Figure 1:
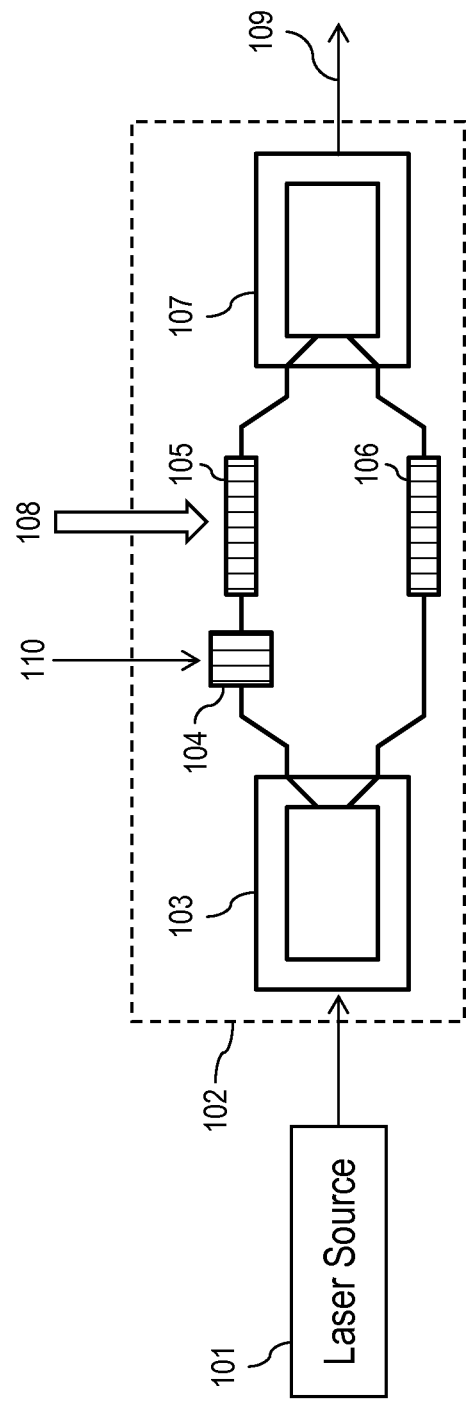
FIG. 1 shows a schematic diagram of a signal generation arrangement as it can be provided by an OLT.

FIG. 1 shows a schematic diagram of a signal generation arrangement as it can be provided by an OLT.

A light source 101 (e.g., a laser source, in particular a laser diode) is connected to a modulator 102, which can be realized as a Mach-Zehnder-Modulator. The signal of the light source 101 is fed to a coupler 103 and further via a phase adjustment 104 and a phase modulator 105 to a coupler 107. The phase adjustment 104 can be controlled via a bias signal 110. The output of the coupler 103 is also conveyed via a phase modulator 106 to said coupler 107.

The modulator 102 is controlled by an electrical signal 108 which comprises several data signals (e.g., several channels 1 ... N utilizing N/2 carriers in the electrical domain).

FIG. 2A shows a schematic diagram (frequency plan) of a spectrum in an optical domain comprising downstream channels (from an OLT to several ONUs) around carrier frequencies located at a given (frequency) distance from a base frequency f0. For example, a channel Ch3 is located at a carrier frequency +8 GHz and −8 GHz from the base frequency f0. The channel Ch3 is used to convey downstream traffic to an ONU5 and to an ONU6. A channel Ch2 is located at a carrier frequency +5 GHz and −5 GHz from the base frequency f0. The channel Ch2 is used to convey downstream traffic to an ONU3 and to an ONU4. A channel Ch1 is located at a carrier frequency +2 GHz and −2 GHz from the base frequency f0. The channel Ch1 is used to convey downstream traffic to an ONU1 and to an ONU2.

FIG. 2B shows a schematic diagram (frequency plan) of a spectrum in an optical domain comprising upstream channels (from the several ONUs to the OLT) in view of the base frequency f0. In an upper band, the ONU1 uses a carrier frequency f0+3 GHz, the ONU3 uses a carrier frequency f0−6 GHz and the ONU5 uses a carrier frequency f0+9 GHz. In a lower band, the ONU2 uses the carrier frequency f0−1 GHz, the ONU4 uses the carrier frequency f0−4 GHz and the ONU6 uses the carrier frequency f0−7 GHz.

The frequency plans indicated in FIG. 2A and FIG. 2B can be determined based on the Nyquist-Shannon-Theorem. However, a sampling rate amounting to 1.2 times larger the maximum frequency can be used.

A signal bandwidth fs can be determined as follows:

$$fs > 1/Ts,$$

wherein Ts is the duration of a symbol. Advantageously, (analog or digital) bandpass filters can be used based on the assumption that a signal requires a bandwidth amounting to 1.5/Ts.

The following shows a table comprising exemplary values for data rate, modulation format, symbol rate and occupied bandwidth. This allows considering guard bands and filter imperfections.

| Data Rate [1/s] | Modulation Format | Symbol Rate [1/s] | Occupied Bandwidth |
|---|---|---|---|
| A | OOK | A | 1.5 × A |
| A | DQPSK | A/2 | 0.75 × A |
| 1.244 Gb/s | OOK | 1.244 Gb/s | 1.866 GHz |
| 1.244 Gb/s | DQPSK | 0.622 Msymb/s | 933 MHz |
| 2.488 Gb/s | OOK | 2.488 Gsymb/s | 3.732 GHz |
| 2.488 Gb/s | DQPSK | 1.244 Gsymb/s | 1.866 GHz |

The parameter A indicates an arbitrary data rate.

Figure 3:
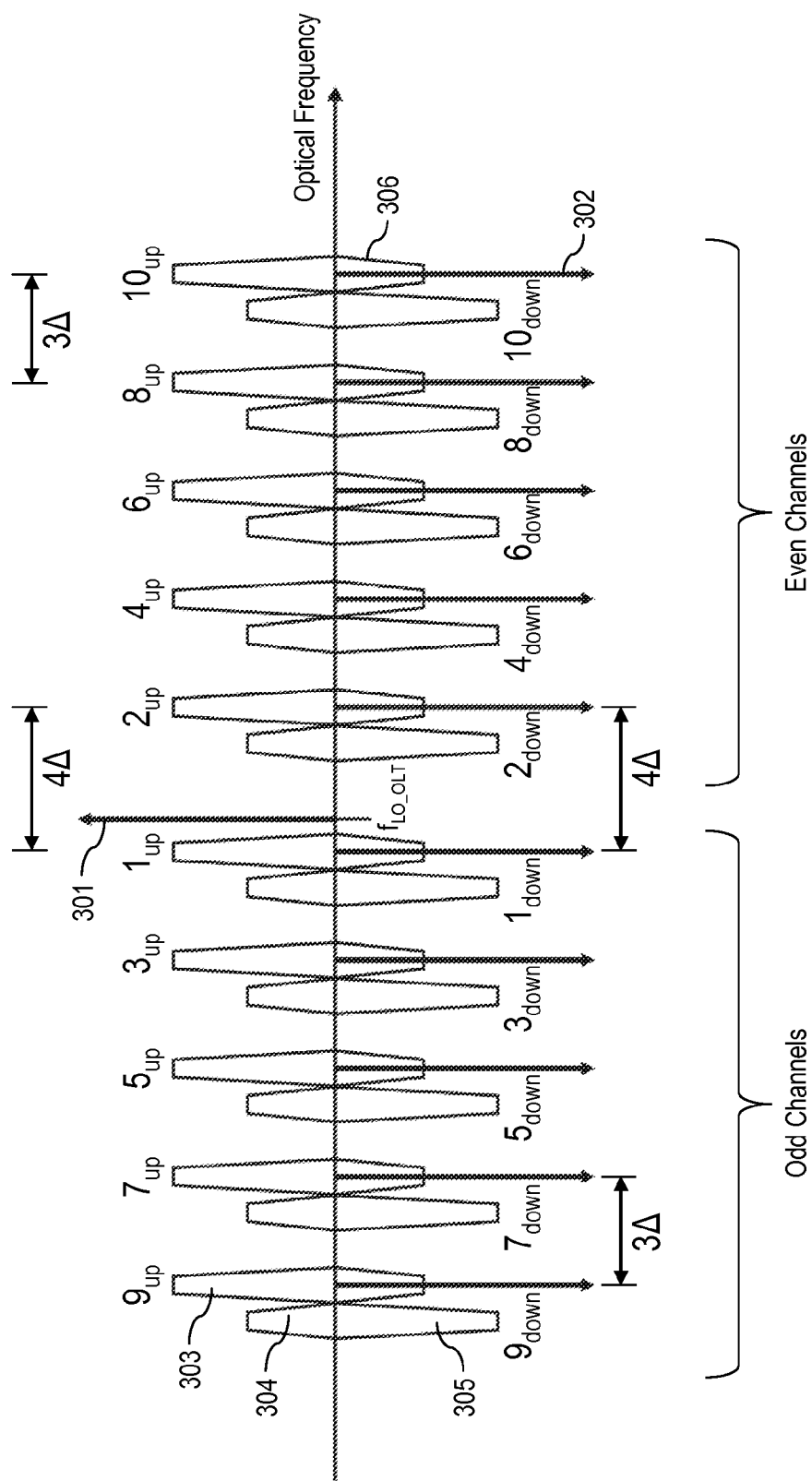
FIG. 3 shows an exemplary frequency diagram in the optical domain.

FIG. 3 shows an exemplary frequency diagram in the optical domain. A local oscillator frequency 301 at the OLT (also referenced as $f_{LO\_OLT}$) is a reference frequency for the other frequencies. The diagram shows signals in upstream direction from the ONUs to the OLT such as 303 and signals in downstream direction from the OLT to the ONUs such as 305. Each signal has a certain bandwidth. The large signals 303, 305 comprise user data, while the small signals 304, 306 are back reflections.

The arrows 302 pointing in downward direction indicate carrier frequencies of the local oscillators at the ONUs. These carrier frequencies are arranged around the frequency 301 as is also indicated in FIG. 2B: The upstream signals according to FIG. 3 are denoted as "$1_{up}$" to "$10_{up}$", wherein the signals "$1_{up}$" and "$2_{up}$" are separated by a frequency "4Δ", wherein Δ may depend on an occupied bandwidth for upstream and downstream signals. The remaining adjacent upstream signals are separated by a frequency amounting to "3Δ".

In downstream direction, the signals "$1_{down}$" to "$10_{down}$" are arranged symmetrically around the frequency 301 (see also FIG. 2A). It is noted that dual sideband modulation can be used to convey traffic in downstream direction.

Figure 4A:
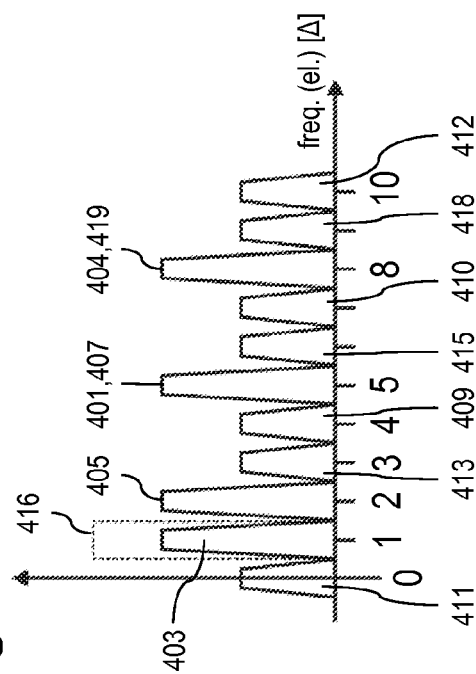

FIG. 4A shows a frequency diagram in an electrical domain (depicting an electrical frequency in view of a spectral density) at a receiver of the ONU that processes the signal "$1_{down}$" 402 utilizing an electrical bandpass filter 401.

The diagram further shows the signals $2_{down}$ 403, $3_{down}$ 404, $4_{down}$ 405, $5_{down}$ 406, $6_{down}$ 407 and $7_{down}$ 408. Also back-reflected signals are depicted, in particular a reflection 409 of the signal $1_{up}$, a reflection 410 of the signal $3_{up}$, a reflection 411 of the signal $2_{up}$, a reflection 412 of the signal $5_{up}$, a reflection 413 of the signal $4_{up}$, a reflection 414 of the signal $7_{up}$ and a reflection 415 of the signal $6_{up}$.

A reflection could comprise a mere reflection and/or a back-scattering, e.g., Rayleigh scattering.

Figure 4B:
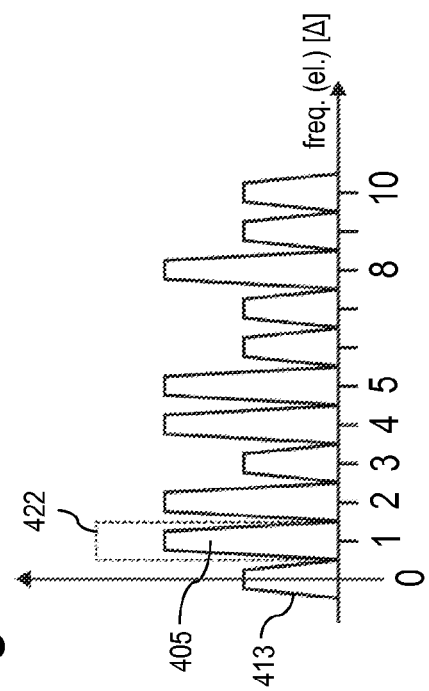

FIG. 4B shows a frequency diagram in an electrical domain (depicting an electrical frequency in view of a spectral density) at a receiver of the ONU that processes the signal "$2_{down}$" 403 utilizing an electrical bandpass filter 416.

The diagram further shows the signals $4_{down}$ 405, $1_{down}$ 401 and $6_{down}$ 407, $8_{down}$ 404 and $3_{down}$ 419 as well as back-reflected signals, in particular the reflection 411 of the signal $2_{up}$, the reflection 413 of the signal $4_{up}$, the reflection 409 of the signal $1_{up}$, the reflection 415 of the signal $6_{up}$, the reflection 410 of the signal $3_{up}$, a reflection 418 of the signal $8_{up}$ and the reflection 412 of the signal $5_{up}$.

Figure 4C:
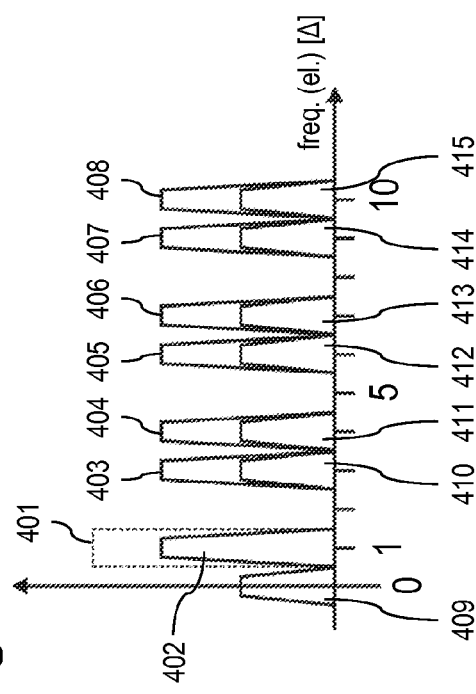

FIG. 4C shows a frequency diagram in an electrical domain (depicting an electrical frequency in view of a spectral density) at a receiver of the ONU that processes the signal "$3_{down}$" 404 utilizing an electrical bandpass filter 420. Also, the reflection 410 of the signal $3_{up}$ is shown.

Figure 4D:
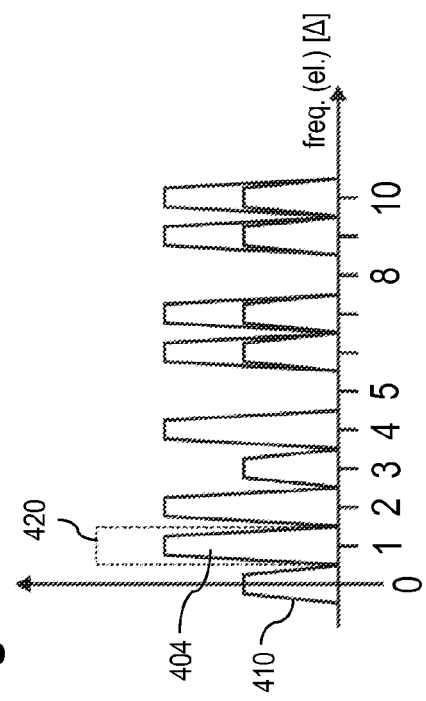

FIG. 4D shows a frequency diagram in an electrical domain (depicting an electrical frequency in view of a spectral density) at a receiver of the ONU that processes the signal "$4_{down}$" 405 utilizing an electrical bandpass filter 422. Also, the reflection 413 of the signal $4_{up}$ is shown.

FIG. 5 shows a frequency diagram in an electrical domain (depicting an electrical frequency in view of a spectral density) at a receiver of the OLT. The data signals 1up to 10up are each filtered by bandpass filters 501 (indicated by the dashed lines). The back-reflections of the down-stream signals are also shown within band gaps between the data signals. The reflection of the signal $1_{down}$ is referred to as R$1_{down}$, etc.

Based on the frequency plans shown in these figures and taking into account the fact that bandwidth occupied for upstream and downstream signals shall not be the same, an allocation of signals (also referred to (logical) channels) could be determined as follows:

| Data Signal (Channel) | Carrier Frequency [GHz] (in electrical domain) |
|---|---|
| 1&2 | 2.8 GHz |
| 3&4 | 7 GHz |
| 5&6 | 11.2 GHz |
| 7&8 | 15.4 GHz |

This is an exemplary frequency plan for a data rate amounting to 1.244 Gb/s per ONU utilizing a DQPSK modulation format at the OLT (2.488 Gb/s) and the ONU (1.244 Gb/s).

The channel spacing between the signals amounts to 3Δ (4.2 GHz) except for the signals 1 and 2 ($1_{up}$ and $2_{up}$ as well as $1_{down}$ and $2_{down}$), for which the channel spacing amounts to 4Δ (5.6 GHz).

Hence, 8 channels occupy about 32 GHz in the optical domain and 16 GHz in the electrical domain resulting in sampling rates of 32 to 38 Gsamples/s to be processed via DACs and ADCs.

At the ONU, an intermediate frequency can be set to 1.4 GHz. The ADC sampling rate may thus be in the range between 4.1 Gsamples/s and less than 5 Gsamples/s.

The following table shows an exemplary frequency plan for a data rate amounting to 1.244 Gb/s per ONU utilizing a DQPSK modulation format at the OLT (2.488 Gb/s) and an OOK modulation format at the ONU (1.244 Gb/s).

| Data Signal (Channel) | Carrier Frequency [GHz] (in electrical domain) |
|---|---|
| 1&2 | 3.732 GHz |
| 3&4 | 9.330 GHz |
| 5&6 | 14.93 GHz |
| 7&8 | 20.53 GHz |

Upstream and downstream signals occupy the same bandwidth. Therefore the channel spacing basic unit Δ amounts to $$\Delta = 1.5 \times 1/Ts = 1.886 \text{ GHz}.$$

The channel spacing between the signals amounts to 3Δ (5.658 GHz) except for the signals 1 and 2 ($1_{up}$ and $2_{up}$ as well as $1_{down}$ and $2_{down}$), for which the channel spacing amounts to 4Δ (7.544 GHz).

Hence, 8 channels occupy about 43 GHz in the optical domain and 21.5 GHz in the electrical domain resulting in sample rates of 43 to 52 Gsamples/s to be processed via the DACs and the ADCs.

At the ONU, the intermediate frequency can be set to 1.886 GHz; the ADC sampling rate may thus be in the range of 5 Gsamples/s.

FIG. 6 shows an exemplary diagram of an N-carrier transceiver that could be located in an OLT. The transceiver comprises a transceiver module 601 and a digital processing unit 602. An optical input signal "Optical In" is conveyed to a receiver 605. A laser serves as a local oscillator LO 603 and conveys a signal via a splitter 604 to the modulator structure 102 (see also, e.g., FIG. 1) and to the receiver 605.

The receiver 605 conveys two analog signals to A/D converters 606 (processing a horizontal polarization), 607 (processing a vertical polarization). The digital signal provided by the A/D converters 606, 607 is processed via a software defined radio (SDR) 608 and further via a processing unit 609, which produces N digital streams (or channels) 610 at a data rate amounting to, e.g., 1 Gbit/s each. A software defined radio is a synonym for a signal processing unit that's functionality is configurable by software. The processing unit 609 provides in particular framing, a general frame procedure, a forward error correction, OAM services, and a broadcast capability.

In the opposite direction for producing an optical output signal "Optical Out" 102, N digital data streams (or channels) 620 are each fed to a processing unit 617 to 619 and further via a QPSK modulation unit 614 to 616 to a carrier generation and modulation unit 613 providing N/2 channels. The output thereof is converted to an analog signal by a D/A converter 612 and forwarded to the modulation structure 102. The modulation structure 102 provides the optical output signal "Optical Out". The bias signal 110 is provided by the processing unit 602 in order to control the phase adjustment 104 of the modulation structure 102 (see FIG. 1).

It is noted that the optical receivers can be (balanced) polarization-diversity receivers. As a modulation format, DQPSK can be used. It is further noted that in the electrical domain, only N/2 carriers can be generated, but with a data-rate of 2 channels (in this example: 2 Gb/s).

Further Advantages:

The solution presented allows a simplified transmitter design, in particular of the OLT. It is also an advantage that no single sideband modulators are required. Furthermore, no costly electrical 90-degree hybrid or orthogonal sine-wave generation means is required. Advantageously, only a single high-frequency modulation signal (instead of 2 or 4 HF signals) is processed. The approach further allows processing of only N/2 carriers in the electrical domain, but with the doubled data rate.

It is another benefit of this solution that the modulator bias control is significantly simplified.

Furthermore, the down-stream capacity can advantageously be split pair-wise (e.g., flexibly in a range from 0 to 2 Gb/s). Also, a broadcast of up to 2 Gb/s can be achieved, wherein a flexible split is possible between resources used for broadcast and resources used for individual data transmission.

It is also an advantage that an existing receiver at the OLT does not have to be changed using the approach presented herein.

LIST OF ABBREVIATIONS

A/D Analog-to-Digital
ADC Analog-to-Digital Converter
Ch Channel
D/A Digital-to-Analog
DAC Digital-to-Analog Converter
DQPSK Differential Quadrature Phase Modulation
FEC Forward Error Correction
FTTB Fiber-to-the-Business
FTTC Fiber-to-the-Curb
FTTH Fiber-to-the-Home
GFP General Frame Procedure
HF High Frequency
LO Local Oscillator
MZM Mach-Zehnder Modulator
NGOA Next Generation Optical Access
OAM Operation, Administration and Maintenance
OLT Optical Line Terminal
ONU Optical Network Unit
OOK ON-OFF keying
PolMux Polarization Multiplex
PON Passive Optical Network
PSK Phase Shift Keying
QPSK Quadrature PSK
RX Receiver
SDR Software Defined Radio
SSB Single Sideband
SSBM SSB Modulator
SW Software
UDWDM Ultra Dense WDM
WDM Wavelength Division Multiplexing

The invention claimed is:

1. A method for processing data in an optical network,
   wherein a centralized component is connected to several decentralized components;
   conveying first data from the centralized component to at least two decentralized components, wherein the at least two decentralized components share an optical resource comprising a dual side-band spectrum; and
   conveying second data from at least one of the decentralized components to the centralized component via at least one separate optical resource.

2. The method according to claim 1, wherein the optical resource and the at least one separate optical resource are not identical and in particular occupy different bandwidths.

3. The method according to claim 1, wherein the optical resource and the at least one separate optical resource correspond to a wavelength range around at least one carrier frequency.

4. The method according to claim 1, wherein the centralized optical component comprises a Mach-Zehnder modulator, a two-beam interferometer or a Michelson interferometer structure.

5. The method according to claim 1, further comprising decoding the first data received at the at least two decentralized components and further processing only a portion of the first data addressed to the particular decentralized component by the particular decentralized component.

6. The method according to claim 5, wherein the shared optical resource is used to convey equal amounts of first data to each of the at least two decentralized components.

7. The method according to claim 5, wherein the first data conveyed to each of the at least two decentralized components via the shared optical resource is logically separated into data portions for each of the at least two decentralized components or for all or a group of the at least two decentralized components.

8. A centralized component in an optical network that is connected to several decentralized components, comprising a processing unit that is arranged for:
   conveying first data from the centralized component to at least two decentralized components via a common optical resource comprising a dual side-band spectrum; and
   receiving second data from at least one of the decentralized components via at least one separate optical resource.

9. The centralized component according to claim 8, wherein the centralized component is an opticalline terminal connected to several optical network units.

10. A communication system comprising centralized component of claim 8.

11. A decentralized component in an optical network that is connected to a centralized component, comprising a processing unit that is arranged for:
    receiving first data from the centralized component, which is also conveyed to at least one other decentralized component via a common optical resource comprising a dual side-band spectrum; and
    conveying second data to the centralized component via at least one separate optical resource.

12. The decentralized component according to claim 11, wherein the decentralized component is an optical network unit connected an optical line terminal.

* * * * *